US 6,704,791 B1

(12) United States Patent
Harris

(10) Patent No.: US 6,704,791 B1
(45) Date of Patent: Mar. 9, 2004

(54) THREE DIMENSIONAL EXPERIENCE FOR THICK AND THIN CLIENTS

(76) Inventor: Scott C. Harris, P.O. Box 927649, San Diego, CA (US) 92192

( * ) Notice: Subject to any disclaimer, the term of this patent is extended or adjusted under 35 U.S.C. 154(b) by 0 days.

(21) Appl. No.: 09/511,746

(22) Filed: Feb. 24, 2000

(51) Int. Cl.$^7$ ................................................ G06F 15/16
(52) U.S. Cl. ...................................................... 709/231
(58) Field of Search ................................. 709/231, 236, 709/245, 203, 232; 345/473, 744, 746, 748, 688, 689

(56) References Cited

U.S. PATENT DOCUMENTS

| | | | |
|---|---|---|---|
| 5,870,220 A | 2/1999 | Migdal et al. | |
| 5,929,860 A | 7/1999 | Hoppe | 345/419 |
| 5,945,996 A * | 8/1999 | Migdal et al. | 345/420 |
| 5,963,209 A * | 10/1999 | Hoppe | 178/27 |
| 5,966,140 A | 10/1999 | Popovic et al. | 345/433 |
| 6,081,278 A * | 6/2000 | Chen | 345/473 |
| 6,362,833 B2 * | 3/2002 | Trika | 345/646 |
| 6,370,267 B1 * | 4/2002 | Miller et al. | 382/154 |
| 6,404,435 B1 * | 6/2002 | Miller et al. | 345/468 |
| 6,421,051 B1 * | 7/2002 | Kato | 345/428 |

FOREIGN PATENT DOCUMENTS

WO    WO 97/31305    8/1997

OTHER PUBLICATIONS

Gabriel Taubin et al.; 3D Geometry Compression; Aug. 8, 1999; SIGGAPH'99, Los Angeles, CA.

* cited by examiner

*Primary Examiner*—Ario Etienne
*Assistant Examiner*—Abdullahi E. Salad

(57) ABSTRACT

Different information is produced for thick and thin clients. The thin client receives first information which can be coarse 3D information and some 2D information such as label information. Additional information is also produced that is used to improve the look of the 3D image. The additional information is sent only to the thick client, not to the thin clients.

10 Claims, 4 Drawing Sheets

THREE DIMENSIONAL EXPERIENCE FOR THICK AND THIN CLIENTS

BACKGROUND

Our application entitled Touch and Feel on the Internet, application Ser. No. 09/505,646 describes using a three dimensional experience to view products over a network, e.g. a remote information server such as the Internet. That application describes a way of displaying the product in a simulated three dimensional form. The form which is displayed enables the user to see the product from different perspectives. This satisfies the desirable goal of the providing the user with the same touch and feel they would get from the product itself but, but over the network. That application also, describes variable image resolution to allow viewing labels on the product. Embodiments are described for commodities, including drugs. Another embodiment describes using this embodiment to allow reading specified pages from a book.

One desirable goal, however, is to obtain as much information as possible, taking into account the characteristics of the computer being used to view the product. However, different connections have different capabilities. A computer with a lot of processing power, connected over a high bandwidth connection, can be thought of as a "thick" client. Conversely, a computer with less processing power, connected over a low bandwidth connection, can be thought of as a "thin" client. Of course, anywhere in between is also possible.

While it is desirable to display as much information as possible, at times that may be inconsistent with the hardware that is being used.

SUMMARY

The present application describes a system of displaying three dimensional information to a user over either a thick or thin client. The system enables varying degrees of resolution of the three dimensional image/model to be transmitted.

BRIEF DESCRIPTION OF THE DRAWINGS

These and other aspects will now be described with reference to the accompanying drawings, wherein.

DETAILED DESCRIPTION

The disclosed system uses varying degrees of resolution. Each object that is represented by the format has at least two different parts, each of which has a different resolution.

A first resolution part could be a simple two-dimensional compressed image such as a gif or jpeg type image.

An alternative optional first part is a first jpeg image indicating the background which will be used as the backdrop of the three dimensional model. A second jpeg shows a two dimensional version of the model only. Then the second jpeg is displayed over the first jpeg, effectively as a second layer.

Next, the three-dimensional model is obtained. The three-dimensional model is preferably compressed into three stages. Three-dimensional models are conventionally represented in terms of meshes or manifolds. These models are well known in the art. It is known to form these models as a progressively rendered model, in which a first part of the compression produces a coarse model, and later information improves the sharpness of the model. Different techniques of such compression are described in U.S. Pat. Nos. 5,966,140; 5,945,996; 5,929,860; and WO 97/31305.

One way of compression is based on the realization that some parts of meshes compress better than others. It is well known that there are difficult parts of the mesh to compress, but other parts of the mesh are easier. Features of the mesh are classified based on the difficulty of compression of those features.

Alternately, an initial mesh can simply be one that has simply a lower resolution. Since the mesh is formed of polygons, this system can use larger polygons to describe the mesh. The first mesh that is provided, therefore, indicates a lower resolution version of the mesh, e.g., one which has harder-to-compress features removed from it. This first version of the mesh, therefore, takes up relatively small amounts of file space/bandwidth.

A second version of the mesh is then obtained which has further detail, and may be obtained, for example, by sub-dividing the mesh into further polygons. For example, each polygon or triangle in the mesh can be sub-divided into three further triangles to provide further detail.

Figure 1:
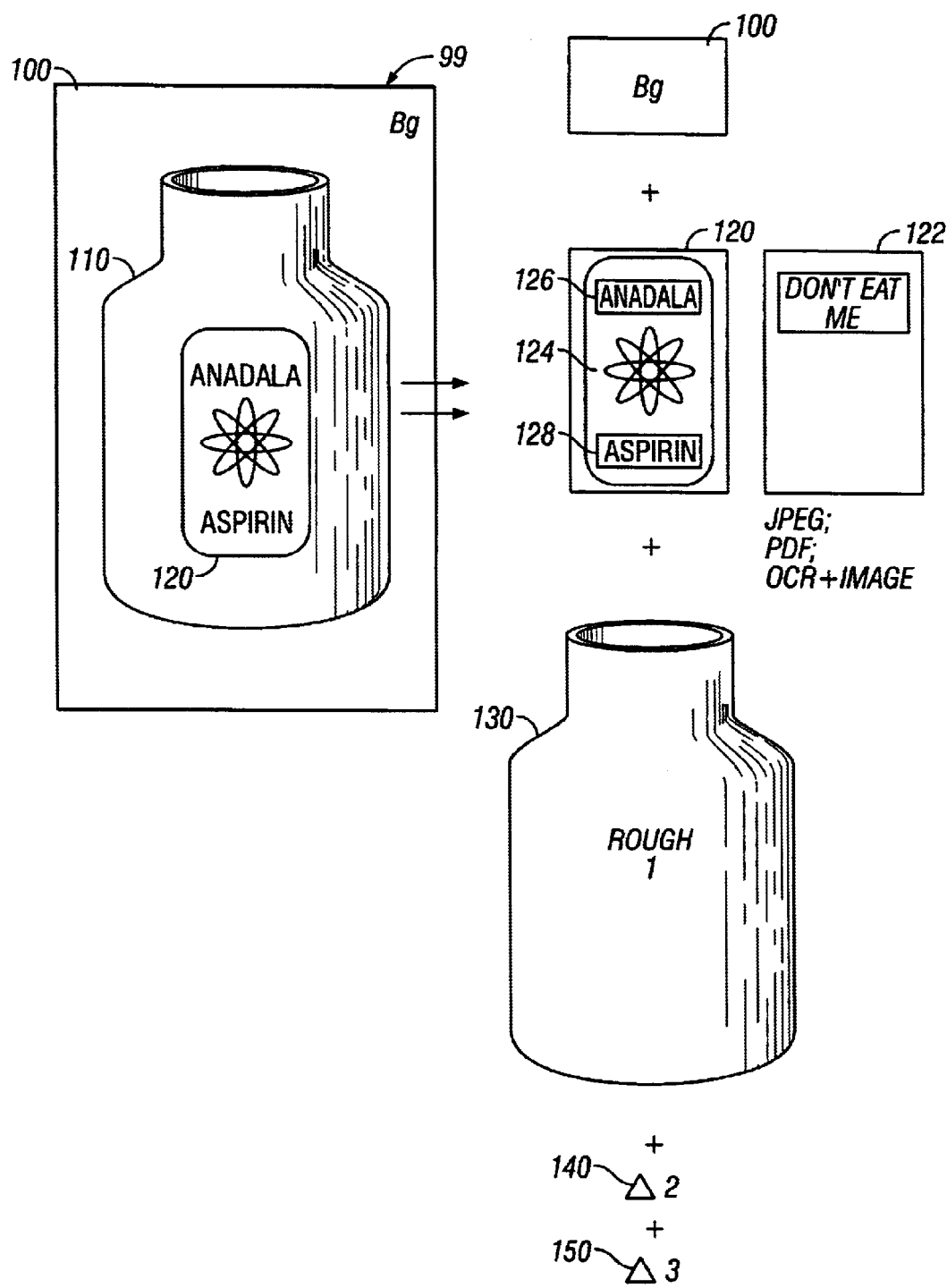
FIG. 1 shows an overall image on the left, and its component parts on the right.

The details of the compression and sending are shown in FIG. 1. The leftmost portion of FIG. 1 shows the overall item and image to be displayed. This includes a background 100, and item 110. The item includes a product shape shown in the Figure. The product shape includes a number of contours around its entire edge. The product also includes an associated label 120 which includes logos and readable information thereon.

According to this embodiment, the displayed scene of the product can be a combination of lower resolution parts and higher resolution parts. This can include both two-dimensional parts and three-dimensional parts. According to this embodiment, the overall scene 99 is decomposed into a plurality of component parts. A first two-dimensional component part can be the background 100. This can include the backdrop against which the product 110 is to be displayed. Background 100 is optional, and instead the displaying client can use its own background as a backdrop.

Another two dimensional object is the text-readable part, shown as label 120. This includes the label representing the information which is printed on the object. There may be many of such labels. For example, in the example of FIG. 1, there may be a label on the front as shown, and also a separate label on the rear. Each of these labels are stored as two dimensional images associated with the view. When the product is being viewed from the front, the label 120 is shown. When the product is being viewed from the rear, the label 122 is shown.

This system can also be used for displaying a book to be read. In this latter case, the label may make up a majority of the part of the item that is seen.

Each of these labels can be further sub-divided into graphics parts and text parts. A graphics part 124 includes those parts of the label which represent logos and the like. These graphics parts can be stored as compressed graphic images using any compression scheme. Another part of each label includes the sections of the label such as 126 and 128 which are identified to include text information. The text information can include readable information. This can be optically character recognized (or typed in by the maker of the label) and stored as ASCII or other text-representing information.

The text can be stored separately from the images. This produces advantages. Text can be stored more efficiently than an image. Also, the text can be handled separately from the image, so that the text can be read at any desired resolution.

The three dimensional parts include more shape information than the two dimensional parts. Even within the three dimensional parts, however, there can be lower resolution parts, and higher resolution parts. FIG. 1 shows separating the overall shape representing the three-dimensional mesh into three separate parts 130, 140 and 150. The first part 130 represents a rough version of the shape. As described above, this rough version can be a low resolution version or alternatively can be an approximation to the actual shape which represents an easier-to-compress shape. Shape parts 140 and 150 represent differences between the rough shape 130 and the actual shape 110. For example delta2 shown as 140 may represent missing detail for 50 percent of remainder of the 3-D mesh. Delta3 150 may represent detail for the remaining 50 percent of the 3-D mesh. While FIG. 1 shows two error signals, it should be understood that a single error signal could exist. In general, however, there is a rough signal 130 and some improvement signal(s) 140, 150. Each of these signals can include sufficient information to enable textual information on the product to be read.

Once any resolution model is received in the client, it can be viewed from any angle, i.e. rotated in any desired way and viewed from any desired angle. When shifted to rotate from the front, the label image 120 is viewed so that the user can view a label. When shifted to view from the rear, the label image 122 is viewed.

The above has discussed viewing a commodity such as a drug bottle or the like. Similar operations can be carried out with a non-commodity item such as an item of clothing, e.g., a dress, sunglasses, or any other item of clothing. In many of these items, labels may not be viewable. In other items such as clothing, the label may represent a size, explain care instructions and materials, or other information. If no label is present, however, the entire scene to be viewed may simply be a first version indicating the rough version of the mesh, and a second version indicating an improvement file which improves resolution of the mesh.

Figure 1X:
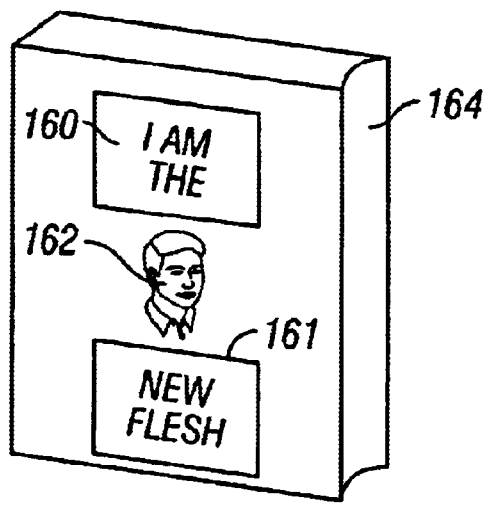
FIGS. 1X, 1Y and 1Z show the label display and operation when displaying a book.
Figure 1Y:
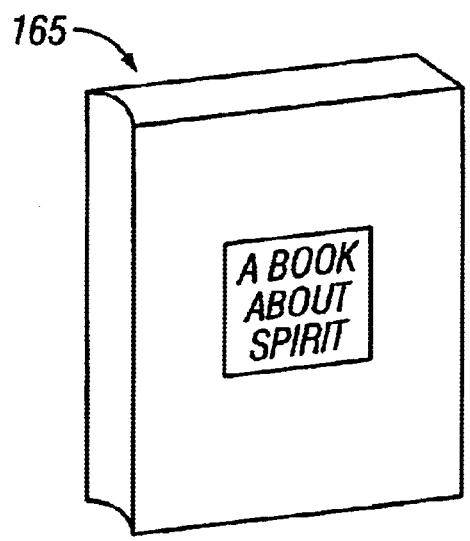
Figure 1Z:
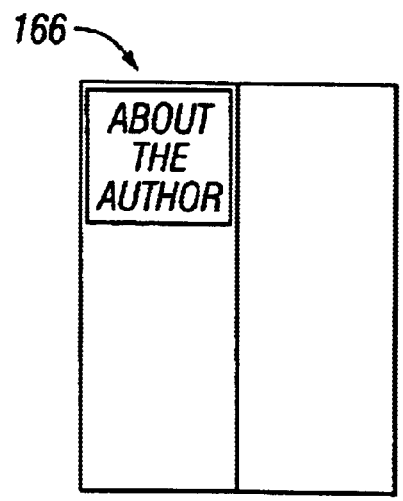

FIG. 1X shows this used for viewing a book or entertainment media. The front 160 is shown with multiple parts. Text boxes 160 and 161 include ASCII text, font and point information. Image 162 is a compressed image, e.g. a JPG image. The shape of the book is shown as a manifold 164. Arrow keys 165, 166 enable turning the book to view different angles. FIG. 1Y shows the rear of the book and FIG. 1Z shows the inside of the book, e.g. the liner notes.

Figure 2:
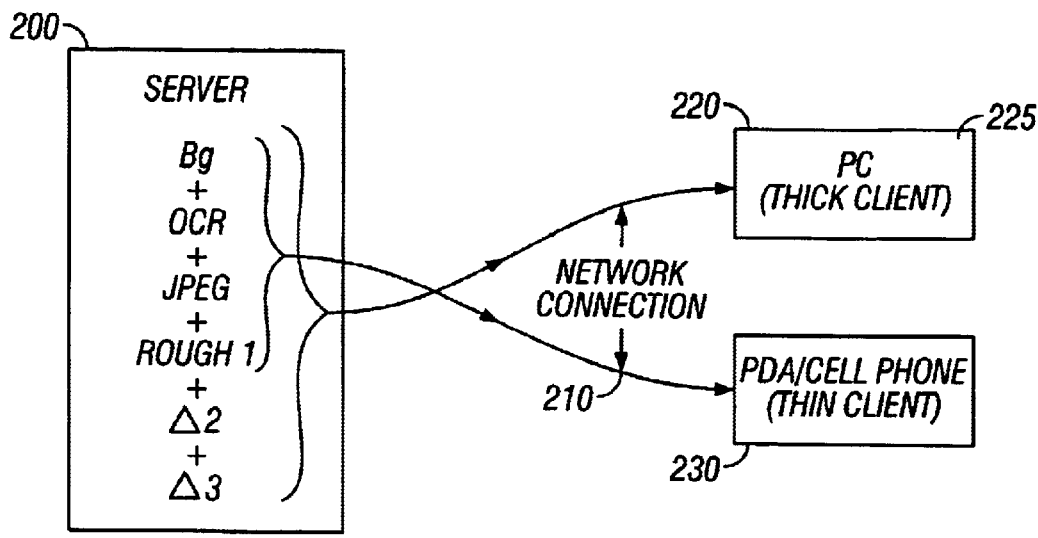
FIG. 2 shows a block diagram of the thick and thin client parts.

The above information is stored in a server of a network system, where the network could be the internet or another network. FIG. 2 shows the connection. The server 200 stores all of the information described above, broken into parts. This information includes the background information, the OCR or text information, the two dimensional jpeg information, the rough 3D information, and the improvement 3D information. The server is connected via a network connection 210 to a client shown generally as 220. The client can be thick client 225, or a thin client 230. Examples of thick clients can include a personal computer or notebook computer which has sufficient processing power. Thin clients can include cellular telephones and personal digital assistants. In this embodiment, the thin client receives less information. The thin client receives only the two dimensional information and the coarse two dimensional information. The thick client, in contrast, receives all the information, including all of the two dimensional information, the rough information and the improvement information. The server and client communicate using known protocols including IP protocols.

Figure 3:
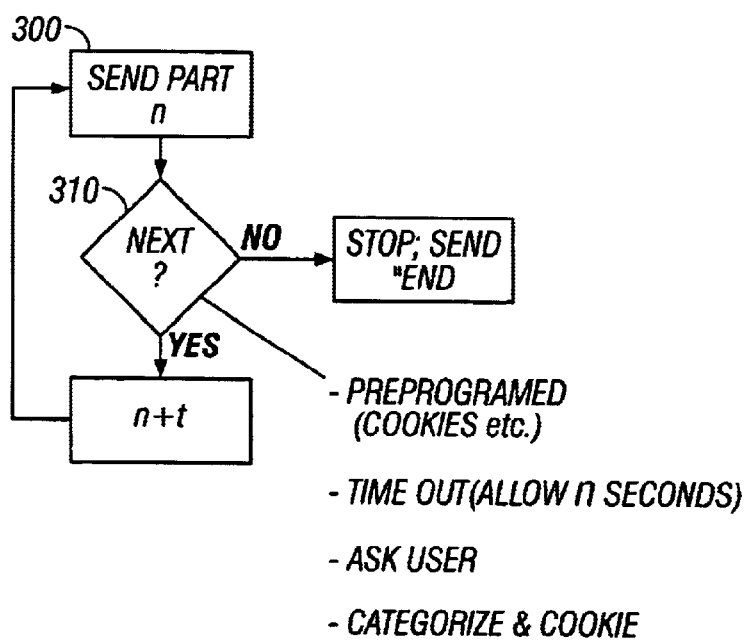
FIG. 3 shows a flowchart of operation.

The flowchart shown in FIG. 3 controls the way in which the devices communicate. At step 300, the server sends to client part n, which can be any numbered part from those enumerated above. At step 310, the client and/or server determines whether the next part should be sent. This determination of whether the next part should be sent can be based on any one of a number of criteria shown in FIG. 3.

The setting criteria can be pre-programmed into the client, using a preference setting mechanism such as a cookie. The cookie can indicate the processing power of the client, which can determine the amount of data that is appropriate for the client to receive. For example, the cookie may indicate maximum data, medium data or thin client data.

The setting criteria can alternately be based on a timer expiration. For example, the system can allow a certain amount of time, e.g., 100 seconds, to receive information. If the total information is not received in that specified time, then the system determines that no further data should be received. This latter operation can also be used as a gauge and balancing element of network activity.

When there is a large amount of traffic on the network, then the speed is decreased, and the system timeout occurs. This causes the client to operate with less information transmission, thereby reducing the load on the network.

When there is less traffic on the network and hence the network is working faster, then more information is received within the specified time, and hence more information is received and accepted.

In one mode, the user pays for a different level of service based on network traffic. The lower level service operates during times of network demand, to enter the lower level mode. During times of less demand, more data is received. In the higher level service, the full data is received at all times. Since many of the subscribers receive less data during these times, network usage is reduced.

This time out technique can also be used to select between the levels of improvement information delta 1 and delta 2 and delta 3.

Another way in which the variable data can be selected is by asking the user. For example, a certain amount of information can be sent to the portable computer to form a first image. The user is then prompted to determine if more information needs to be sent. The user can have the option of preventing further information from being sent, or receiving further information. These preferences, once set, can become part of a cookie. The cookie can indicate preferences based on the kind of item being viewed. For example, a good, a commodity, or clothing may be viewed in different resolutions.

The categorizations can then be marked with preferences. For example, for clothing, the user may be willing to view more coarse characterization. However, for commodities, the user may want more detailed Characterization. For books, the text may be the important part, so even less resolution may be acceptable. The readable information can still be presented at a sufficient resolution to allow reading, since the readable information is stored as text rather than being stored as an image.

Figure 5A:
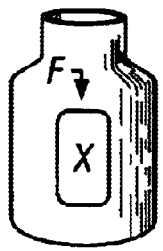
FIGS. 5A–5C show views of the object from different views, still showing the label.
Figure 5B:
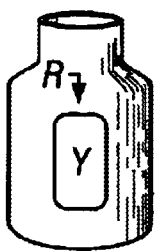
Figure 4:
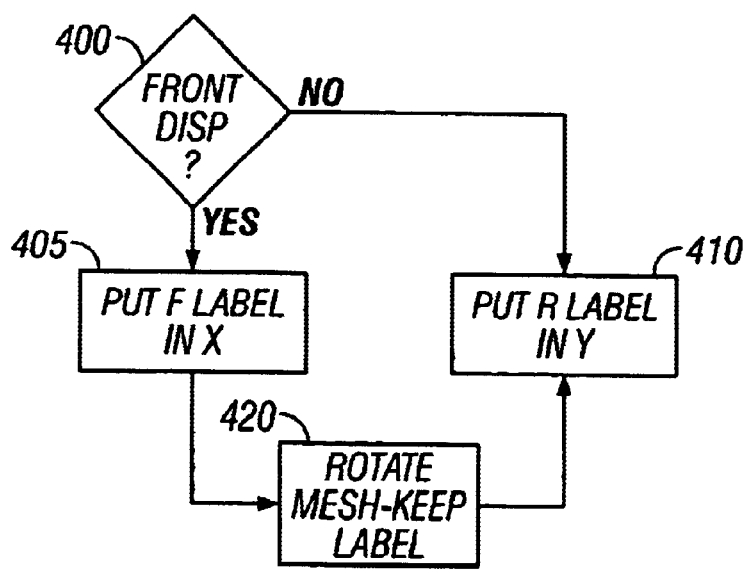
FIG. 4 shows a flowchart of operation of showing the label.

The image/shape can be displayed as shown in FIG. 4. At 400, the system determines if the front or rear of the mesh is being displayed. If the front is being displayed, then control passes to 405. If there is a label associated with the mesh, then the mesh as an assigned area for label display. The F label, representing the label for the front of the product, is associated with the front display. The front label F is then put in the position X which is the position reserved for the label. This is shown in FIG. 5A.

If the mesh has been rotated so that the rear is showing, control passes to step 410 which displays the R label, for the rear of the device, in the section Y. Both allow the mesh to be rotated as shown in FIG. 420.

The mesh can be rotated so that it is only showing an edge on view. However, the label is still displayed in a similar way, so that it still can be read. This is shown in FIG. 5C.

Figure 5C:
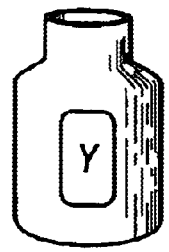

FIG. 5C shows that scenario, where the bottle is rotated so that mostly the edge of the aspirin is showing. However, the label is still as shown so that it remains readable.

Although only a few embodiments have been disclosed in detail above, other modifications are possible.

All such modifications are intended to be encompassed within the following claims.

What is claimed is:

1. A method, comprising:

first producing first information indicative of lower resolution information about an item;

second producing second information indicative of higher resolution information about said item, said higher resolution information including three dimensional information about said item;

sending at least one of said first and/or second information over a network to a client and displaying said information on said client, such that a first client with less information handling capability receives only said first information, and a second client with a second information handling capability greater than said first information handling capability receives both said first information and said second information;

sending and displaying textual information about the item, to be displayed on both said first client and said second client;

allowing a three dimensional representation of said item that is based on said information, to be rotated; and wherein said textual information stays readable in all positions of rotation.

2. A method as in claim 1, wherein said sending comprises sending over the Internet.

3. A method, comprising:

first producing first information indicative of lower resolution information about an item wherein said first information includes both two dimensional information, and three dimensional information indicative of a coarse representation of shape of an object;

second producing second information indicative of higher resolution information about said item, said higher resolution information including three dimensional information about said item; and sending at least one of said first and/or second information over a network to a client and displaying said information on said client, such that a first client with less information handling capability receives only said first information, and a second client with a second information handling capability greater than said first information handling capability receives both said first information and said second information.

4. A method as in claim 3, wherein said two dimensional information includes label information indicating a label associated with said object.

5. A method, comprising:

first producing first information indicative of lower resolution information about an item including two-dimensional information;

second producing second information indicative of higher resolution information about said item, said higher resolution information including three dimensional information about said item;

sending at least one of said first and/or second information over a network to a client and displaying said information on said client, such that a first client with less information handling capability receives only said first information, and a second client with a second information handling capability greater than said first information handling capability receives both said first information and said second information;

sending said first information to said client;

determining if said second information should be sent to said client; and wherein said determining comprises determining a time required to send said first information and sending said second information only if said time is less than a specified length.

6. An apparatus, comprising:

a server computer, having first information indicative of lower resolution information about an item to be viewed including two dimensional information about said item, and second information indicative of higher resolution information about said item to be viewed, said higher resolution information including three dimensional information about said item;

a network connection, connected to said server computer;

a first client computer, connected to said network, said first client computer receiving only said first information over said network and displaying said first information on said first client; and a second client computer, connected to said network, and receiving first said first information and displaying said first information, and then receiving said second information and displaying said second information in a way that improves a resolution produced by said first information.

7. An apparatus as in claim 6, wherein said first information includes textual information with textual information, to be displayed on both said first client and said second client.

8. An apparatus as in claim 7, wherein said information is a three dimensional representation, and further comprising a user interface on said clients which commands said three dimensional representation to be rotated and wherein said textual information remains readable in all rotational orientations.

9. An apparatus as in claim 6, wherein said network is the Internet.

10. A method, comprising:

first producing first information indicative of lower resolution information about an item including two-dimensional information;

second producing second information indicative of higher resolution information about said item, said higher resolution information including three dimensional information about said item;

sending said first information over a network to a client, and determining if said second information should be sent to said client;

wherein said determining determines characteristics of the network; and wherein said determining comprises determining a time required to send said first information and sending said second information if said time is less than a specified length.

* * * * *